Aug. 1, 1939.       J. B. GRAHAM ET AL       2,167,896
PLUG FOR LINING UP AND WELDING CASING AND LINE PIPE
Filed July 15, 1937       2 Sheets-Sheet 1
FIG.1.
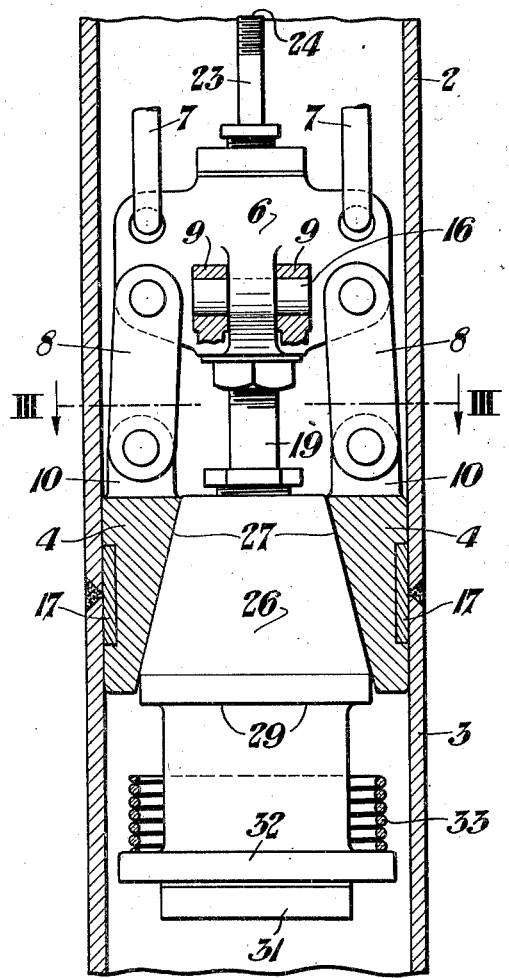
FIG.2.
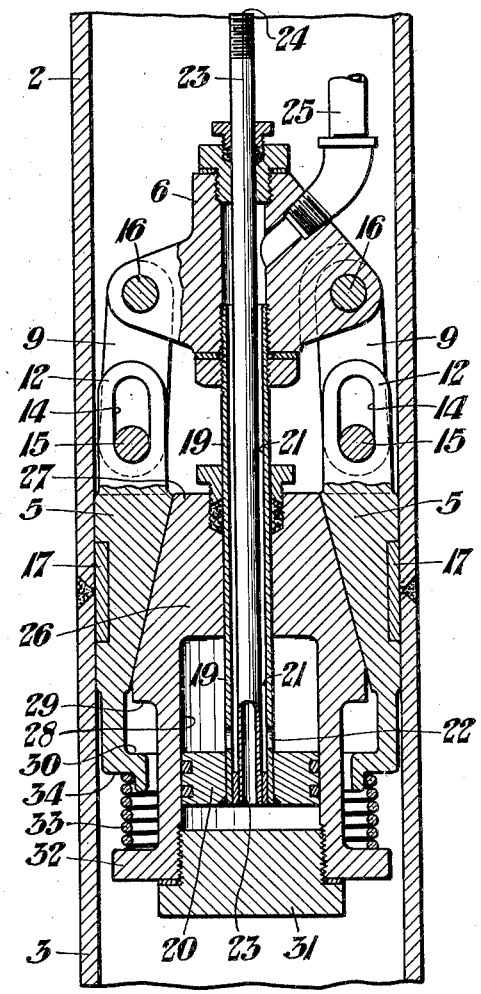
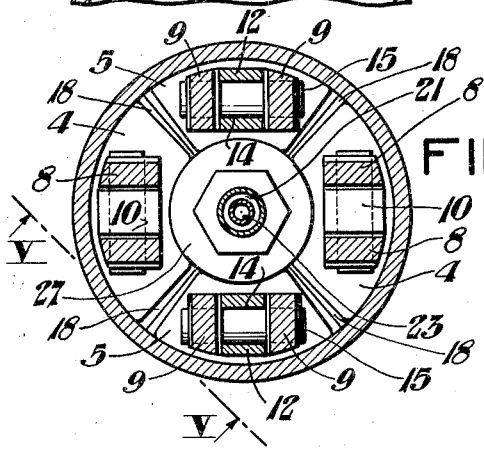
FIG.3.
Inventors:
JAMES B. GRAHAM
and RAOUL G. MAYER.
by: *Usina & Lauber*
their Attorneys.

Aug. 1, 1939. J. B. GRAHAM ET AL 2,167,896
PLUG FOR LINING UP AND WELDING CASING AND LINE PIPE
Filed July 15, 1937 2 Sheets-Sheet 2
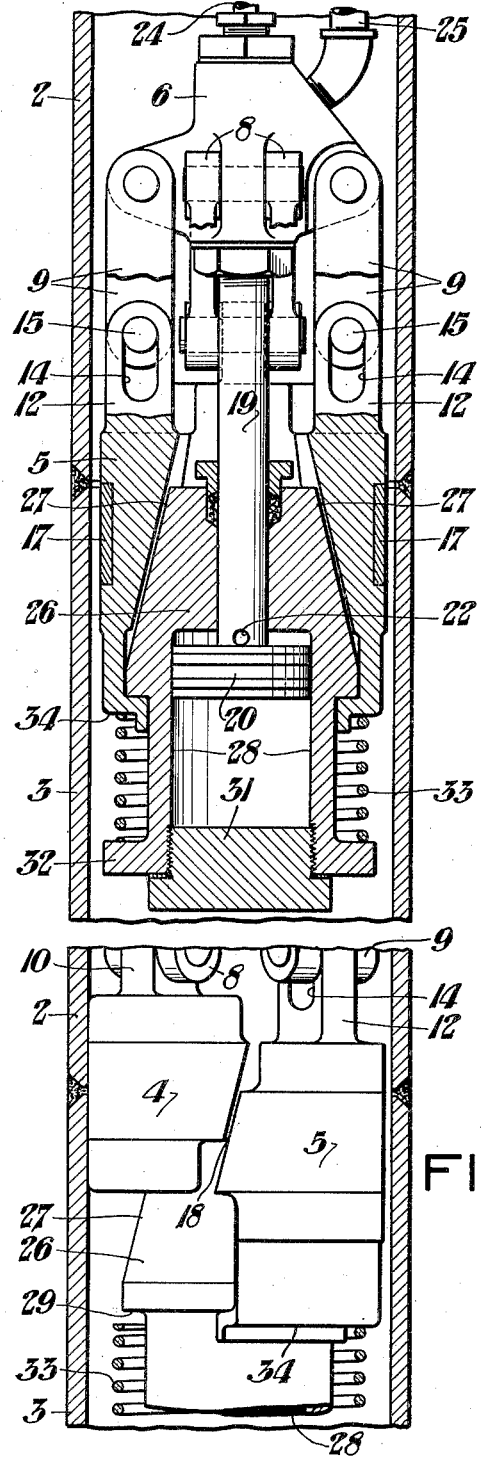
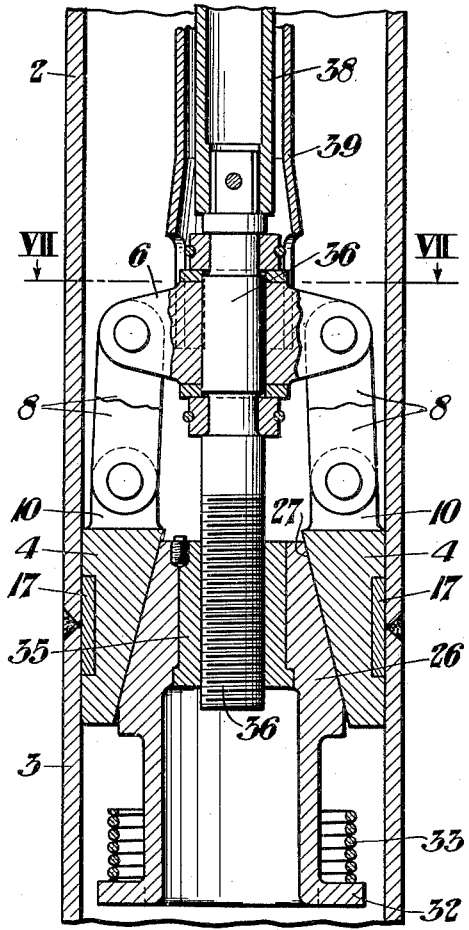
Inventors:
JAMES B. GRAHAM
and RAOUL G. MAYER.
by: Usina & Lauber
their Attorneys.

Patented Aug. 1, 1939

2,167,896

UNITED STATES PATENT OFFICE 2,167,896

PLUG FOR LINING UP AND WELDING CASING AND LINE PIPE

James B. Graham, Mount Lebanon, and Raoul G. Mayer, Wilkinsburg, Pa., assignors to National Tube Company, a corporation of New Jersey Application July 15, 1937, Serial No. 153,863

5 Claims. (Cl. 113—103)

This invention relates to an apparatus for aligning abutting sections of pipe preparatory to welding the sections together.

An object of the present invention is to provide a collapsible device that can be lowered into a section of casing held in vertical position in the derrick and aligned with the adjoining section, suspended in the well, to which it is to be welded before being also run into the well.

Another object of this invention is to provide means for aligning abutting sections of pipe that can be applied to the inside of the pipe to hold the pipe sections in rigid position and provide an unobstructed access to the outside of the joint during the welding operation.

Other objects and advantages will become apparent as the description proceeds, in which:

Figure 1 is a sectional elevation of the apparatus of the present invention showing the members in position within the pipe sections, Figure 2 is a longitudinal sectional view of Figure 1, Figure 3 is a section on the line III—III of Figure 1, Figure 4 is a sectional elevation similar to Figure 2 but showing the segments collapsed within the pipe sections, Figure 5 is a section on the line V—V of Figure 3, Figure 6 is a detailed sectional elevation of another form of construction, and Figure 7 is a section on the line VII—VII of Figure 6.

In the drawings, the numerals 2 and 3 represent abutting sections of pipe to be properly aligned by the present invention preparatory to the welding of said sections together.

The apparatus for aligning the abutting pipe sections comprises a hollow segmental cylinder including segments 4 and 5. A supporting plate or frame 6 is adapted to be suspended within the pipe section by cables 7 or the like. Pivotally connected to said supporting frame are a plurality of links 8 and 9 adapted to pivotally support said segments upon said supporting frame.

The segments 4 are provided with lugs or ears 10 extending therefrom for pivotal connection with said links 8, while the segments 5 are provided with extending lugs or ears 12, each of which has a slot 14 to permit vertical movement of said segments 5 over the pins 15 carried by said links 9. Under such a construction, the segments 5 are adapted for a swinging movement about the pivot 16, while the slot 14 permits a vertical movement of the segments 5 over the pins 15 which are connected to or carried by said links 9.

The segments 4 and 5 are provided with grooves within which are positioned chill rings 17. These chill rings may be copper or any other metal having a greater heat conductivity than the metal of said segments 4 and 5. The edges of the segments 4 and 5 are offset in a vertical plane with respect to each other so that the contact faces of said chill rings are disposed at an angle to the transverse plane of said segments, as shown at 18 in Figure 5.

Rigidly supported by said plate or frame 6, and carried thereby, is a piston-rod 19 having on one end thereof a piston 20. The piston-rod 19 contains two longitudinal conduits separated from each other for the transmission of fluid pressure to the opposite sides of the piston 20. Through the passageway or conduit 21, fluid pressure may enter on one side of the piston 20 through apertures 22, while pressure may be applied to the other side of said piston through the conduit 23. Fluid pressure for the conduit 23 is admitted through the opening 24, while pipe 25 conveys fluid pressure to the conduit 21.

A hollow cylindrical plug 26 is slidably positioned on said piston-rod and provided with a tapered end portion 27. This end portion has the shape of the frustum of a cone and is adapted, when moved by the fluid pressure within a cylinder 28 formed by the walls of said plug, to coincide with the tapered inner faces of said segments 4 and 5 which, in assembled position, are of a similar frustum shape.

The hollow cylindrical plug 26 is provided with an annular shoulder 29 adapted to contact the shoulders 30 formed on said segments 5 when said aligning device is in contracted position so that plug 26 with its integrally formed cylinder 28 is carried thereby. These shoulders 29 and 30 may also be used to free the segments 5 from any welding metal which has become frozen to them during the operation of the welding together of the adjacent sections of pipe by bringing pressure (either a steadily increasing one or a sudden shock) to bear on them through the opening movement of said cylinder.

The cylinder 28 is closed at its end by means of a threaded plug 31. An annular collar 32 extends outwardly from the walls of said cylinder 28 to provide a seat for the spring 33 which engages an annular flange 34 formed on said segments 5.

In Figure 6, the segmental members 4 and 5 are of the same construction as set forth in the preceding figures. However, the means for forcing the plug 26 into engagement with the tapered inner faces of said segments 4 and 5 has been modified. The plug 26 has a central bore in its tapered end within which is positioned and retained, in any conventional manner, an internally threaded nut 35. A rod 36 freely revolves within an opening formed in the cross-head 6 and is provided with a threaded end adapted to threadedly engage said nut 35. By rotating the handle member 38, the plug 26 is moved vertically so as to engage or disengage the tapered inner faces of said segments 4 and thus expand them against the inner walls of said adjacent pipe sections. The forked member 39 maintains said segments 5 relatively stationary until the pins 15 engage the top portion of said slots 14, after which, the continued rotation of said handle member 38 will cause said segments 5 to move vertically to bring the inclined faces of said chill rings into engagement with each other and maintain said pipe sections rigidly in position for the welding operation.

In operation, the aligning apparatus is suspended within the inner walls of the abutting pipe sections by means of the cable or other conventional type of suspension means, so that the segments 4 and 5 will be in a position to expand against the inner walls of said abutting pipe sections in order to rigidly hold them in position for the welding operation. After the segments have been positioned within the pipe sections, pressure is admitted to the cylinder 28 above the piston 20, whereby the cylinder and plug 26 will be moved upwardly so that the tapered end of the plug will engage the inner inclined faces of segments 4 to expand them laterally against the inner walls of the abutting pipe sections. As the plug 26 moves upwardly, the segments 5 likewise move upwardly through the pressure of the springs 33 which are positioned between the flange 32 on the end of the cylinder 28 and the annular ring 34 on the segments 5. However, the segments 5 will not expand laterally until the pins 15 have moved their limit within the slots 14 formed in the ears 12 carried by said segments 5. When this limit has been reached, the segments 5 are then expanded laterally upon further upward movement of the tapered plug 26 so as to firmly wedge the segments 4 and 5 in contact with each other along the inclined face 18 formed on the chill ring and shown in Figure 5. This provides a rigid engagement with the inner peripheral walls of the abutting pipe sections and produces a continuous and uninterrupted surface so that access may be had for welding the pipes on their outside cylindrical surfaces.

The apparatus of the present invention may, if desired, be used as a grapple for lifting the casing lying horizontally in the stock pile to a vertical position for subsequent alignment with an adjacent pipe section. When it is desired to lift a pipe section from the stock pile, the segmental sleeve is inserted through the pipe and positioned adjacent the end thereof, and the cable extending to the derrick is wound upon a conventional type drum. The pressure is admitted to the cylinder in the manner hereinbefore described to expand the segmental sleeve to engage the inner wall of the pipe section and form a rigid clamp for said pipe section whereby, upon further rotation of the drum, the pipe section is lifted from its horizontal position in the stock pile to a vertical position whereby it may be properly aligned with the adjacent section of pipe within the well.

In the construction of Figure 6, after the segmental sleeve is inserted into the pipe section, the handle member 38 is rotated to move the plug 26 so it will engage the tapered inner walls of the segments and thus expand them against the inner wall of the pipe. The pipe is then capable of being lifted from its horizontal position in the stock pile to a vertical position and subsequently aligned with the adjacent section of pipe within the well.

While we have shown and described specific embodiments of the present invention, it will be seen that we do not wish to be limited exactly thereto, since various modifications may be made without departing from the scope of the invention as defined by the following claims.

We claim:

1. An apparatus for aligning abutting ends of pipe sections comprising in combination a supporting frame, a segmental sleeve having an even number of segments, links connecting said segments to said frame, means on some of said segments cooperating with means on said links to permit both axial and radial movement of said segments, a plug for expanding said segmental sleeve and means for moving said plug to expand or contract said sleeve, an annular shoulder on said plug, shoulders on the axially moving sleeve segments, said shoulders contacting each other for supporting said plug in collapsed position.

2. An apparatus for aligning abutting pipe sections comprising in combination a supporting frame, a segmental sleeve consisting of an even number of segments, links connecting said segments to said frame, certain of said segments having only a radial movement while other of said segments have both radial and axial movement, an expanding plug, means on said plug for supporting said plug on axial moving segments of said sleeve, said plug including means for seating a resilient member between said plug and said segments and means for moving said plug to engage and disengage said segmental sleeve with the inner walls of said pipe sections.

3. An apparatus for aligning abutting pipe sections including a segmental sleeve having tapered inner faces and a tapered expanding plug, said sleeve comprising an even number of segments connected to a supporting frame, alternate segments of said sleeve having only a radial movement and the other of said segments having both a radial and axial movement, said expanding plug connected to the axially moving segments for movement to free said segments from frozen welding metal of the joint, said plug provided with means for seating a resilient member, said resilient member contacting the axially moving segments of said sleeve whereby axial movement is given said segments by said plug prior to the engagement of its tapered portion with the inner faces of the segments for radial movement thereof.

4. An apparatus for aligning abutting pipe sections comprising in combination a segmental sleeve, means for supporting said segmental sleeve within said pipe sections, some of said segments of said sleeve having both axial and radial movement, a piston rod carried by said supporting means, a piston on said rod, a hollow cylindrical plug slidably mounted on said piston rod, means for closing the end of said plug, said plug having a tapered end portion, said segmental sleeve having tapered inner surfaces and means for supplying fluid pressure to said cylindrical plug to move said plug so that the tapered portion will engage the tapered inner surfaces of said segments for expanding said segments into contact with the inner wall of said abutting pipe sections.

5. An apparatus for aligning abutting pipe sections comprising a segmental sleeve, said segments having tapered inner surfaces, means for supporting said sleeve within said pipe sections, a tapered hollow plug adapted to contact said tapered inner surfaces of said segmental sleeve to move said segments into contact with the inner walls of said abutting pipe sections, said plug having a cylinder formed thereon, a piston within said cylnder, said piston carried by said supporting means and means for supplying fluid pressure to one side of said piston for moving said plug into contact with said segments of said sleeve, whereby the abutting pipe sections are held rigidly in poition during a welding operation.

JAMES B. GRAHAM.
RAOUL G. MAYER.